July 11, 1967  R. C. ROE ETAL  3,330,739
MULTI-CELL FLASH DISTILLATION SYSTEM
Filed June 5, 1964  6 Sheets-Sheet 2

INVENTORS
RALPH C. ROE.
JOSEPH LICHTENSTEIN.
BY Ward, Haselton, McElhannon, Orme, Brooks & Fitzpatrick
ATTORNEYS.

United States Patent Office 3,330,739
Patented July 11, 1967

3,330,739
MULTI-CELL FLASH DISTILLATION SYSTEM
Ralph C. Roe, Tenafly, N.J., and Joseph Lichtenstein,
Bayside, N.Y., assignors, by mesne assignments, to
Saline Water Conversion Corporation, a corporation of
New York
Filed June 5, 1964, Ser. No. 372,858
13 Claims. (Cl. 202—173)

This invention relates to the separation of solvents from their solution; and more particularly, it is directed to an improved evaporation type fresh water recovery system.

One of the more common fresh water recovery techniques is that known as multiple effect flash distillation or multi-step flash evaporation. According to this technique, brine or sea water to be purified is first heated and is then passed successively through each of a series of flash chambers. Each flash chamber is maintained at a pressure slightly below the vapor pressure of the incoming brine so that a portion of the brine flashes, or suddenly evaporates, into vapor. The heat required for this vaporization is obtained from the portion of the brine which does not evaporate. This lowers the temperature and vapor pressure of the unevaporated brine to a point below the pressure in the chamber but still above the pressure in the next adjacent chamber. Consequently, in the next chamber a further portion of the brine evaporates and so on. The vapor formed in each chamber is separated from the brine and is caused to condense on cooled surfaces within the chamber; and is thereafter drawn off in a common fresh water collection system.

In order to obtain maximum heat recovery, the condenser of each chamber are cooled by means of a continuous system of conduits through each of which the sea water or brine to be purified passes in series in a direction counterflow to the movement of the flashing brine through the chambers. Thus the cooling water in flowing through the condenser conduits in each chamber, in addition to causing condensation of vapor in the chamber, itself absorbs heat; so that the amount of external heat which must be added to the brine becomes considerably reduced. This concept may be extended by increasing the number of chambers or stages; so that more fresh water may be produced with less external heat.

The limiting factor in improving heat efficiency through multiplication of stages and effects lies in the fact that such a technique involves a considerable capital expenditure, due primarily to the condensers and means for transferring fluids under controlled conditions from one stage to the next. Because of this, it has been necessary to restrict the number of chambers or stages in a flash evaporation system to a point beyond which the savings in heat energy input is insufficient to offset the increase in equipment costs.

The present invention makes it possible to extend the point at which the capital cost of a system precludes the savings obtained in multiple staging. The invention further makes possible a multiple stage system which has far greater capacity than previous systems of comparable size and cost.

The above and other features are obtained by means of a novel construction wherein there are provided a plurality of evaporation cells in vertical alignment, each cell having its own condenser means and means for controllably directing the flow of brine into and out from the cell while maintaining a prescribed pressure within the cell. The pressure isolation from cell to cell may be obtained by providing horizontal partitions which terminate at the film surfaces; or, as shown in one embodiment, two facing film surfaces may be closely positioned to produce a nozzle effect upon the evaporating vapors whereby the kinetic energy of these vapors will support the necessary pressure differential.

A continuous condenser conduit is provided with its outer surfaces being exposed within each cell and arranged so that brine or sea water passes first through that portion of the condenser associated with the lower pressure cells and finally with that portion associated with the higher pressure cells. As the sea water passes through the condenser, it absorbs heat from the vapors which it causes to condense. After leaving the condenser, this water is then heated to a somewhat higher temperature and is then caused to pass through the various cells as above described.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may be utilized as a basis for the designing of other structures for carrying out the several purposes of the invention. It is important, therefore, that the claims be regarded as including such equivalent construction as do not depart from the spirit and scope of the invention.

Certain specific embodiments of the invention have been chosen for purposes of illustration and description, and are shown in the accompanying drawings, forming a part of the specification, wherein.

Figure 1:
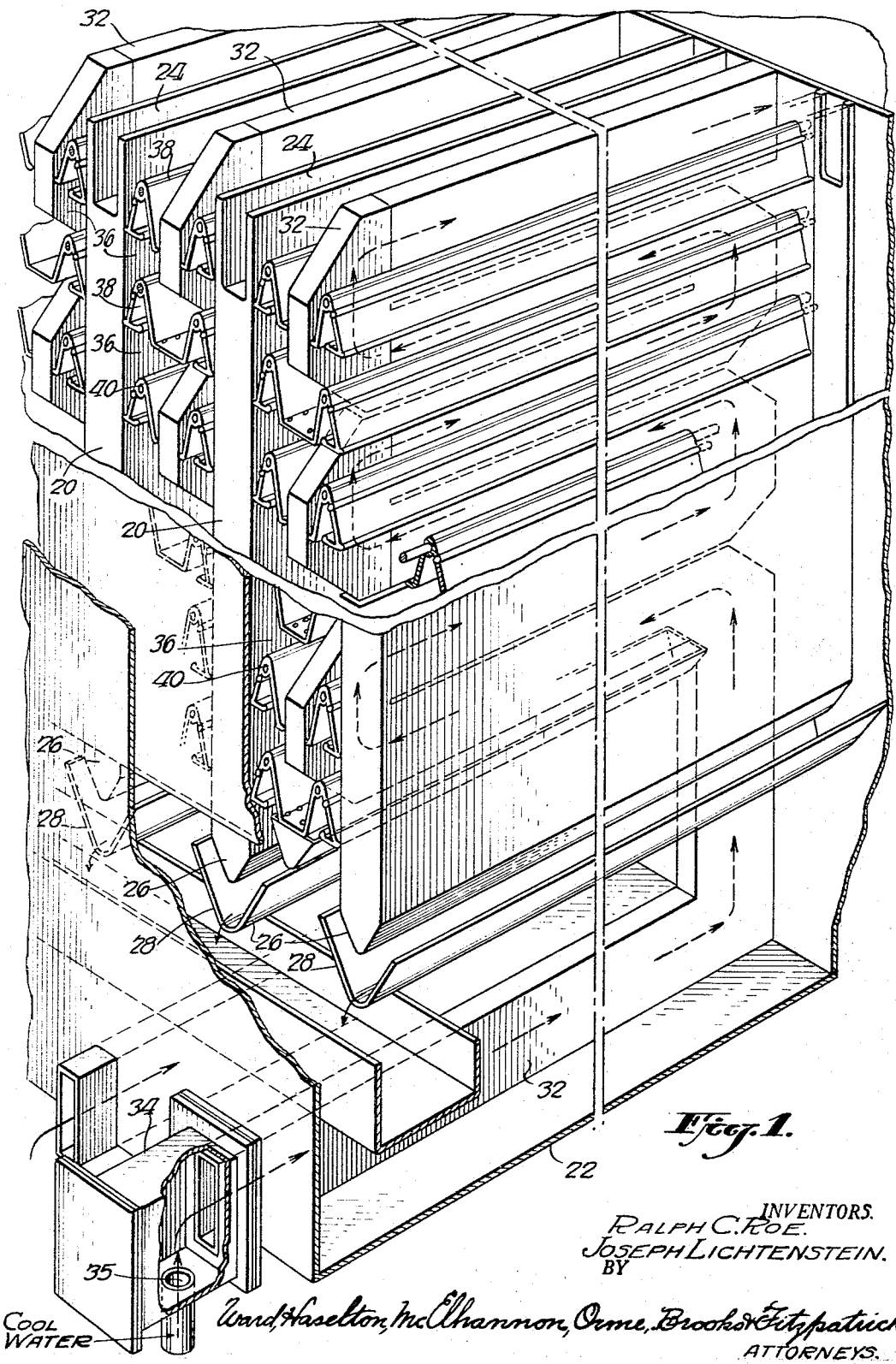
FIG. 1 is a perspective view, partially broken away, illustrating a representative portion of one embodiment of the present invention.
Figure 2:
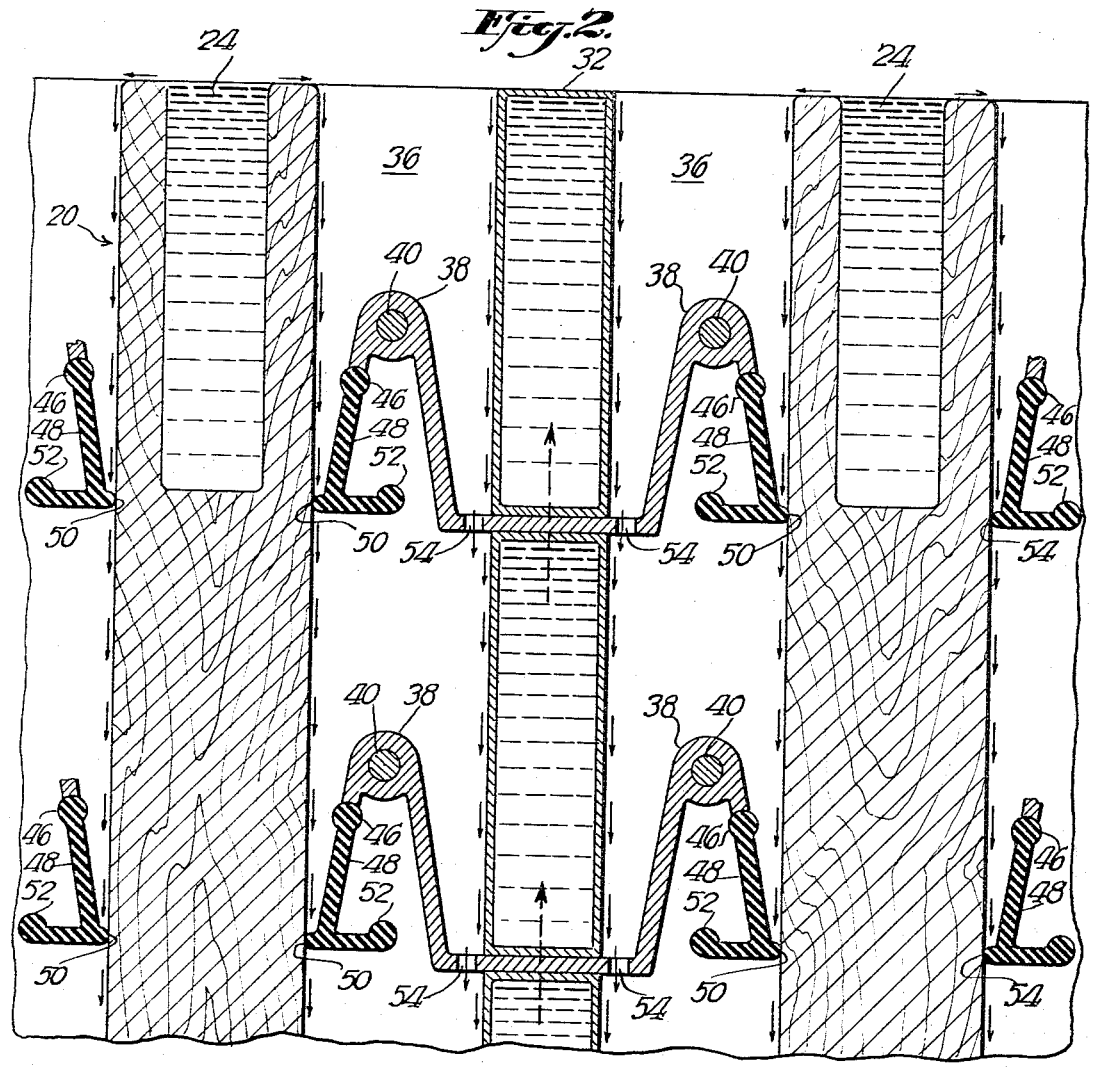
FIG. 2 is an enlarged section view taken along line 2—2 of FIG. 1.

The fresh water recovery device shown in FIG. 1 comprises a plurality of evaporator plates 20 positioned parallel to each other in vertical or standing position within an outer housing 22. The tops of the plates are formed with troughs 24 which extend from the front to the back edge of each plate. These troughs are supplied with brine or sea water to be purified. As shown in FIG. 2, this water fills the troughs and overflows down over the surfaces of the evaporator plates 20.

The bottom of each evaporator plate 20 is formed with a taper as at 26. This serves to direct the brine which passes fully over the evaporator plates into residue troughs 28 which are positioned under each evaporator plate. These residue troughs empty into a common discharge channel 30 which empties, for example, into the sea.

Between each evaporator plate there is positioned a condenser conduit 32. These condenser conduits are folded back and forth over themselves so that they form a substantially solid wall parallel to and facing, but displaced from the surface of the evaporator plates 20. It will be appreciated that fluid entering the lower end of each condenser conduit 32 and passing therethrough will proceed back and forth from front to back of the device, gradually proceeding toward the top thereof. A common intake manifold 34 is provided near the bottom of the device to direct cool sea water which enters through an inlet pipe 35 into the lower end of each condenser conduit. The water which has passed through each conduit is collected, heated and redirected, as will be explained hereinafter, into each of the troughs 24 at the top of the evaporator plates 20.

Figure 3:
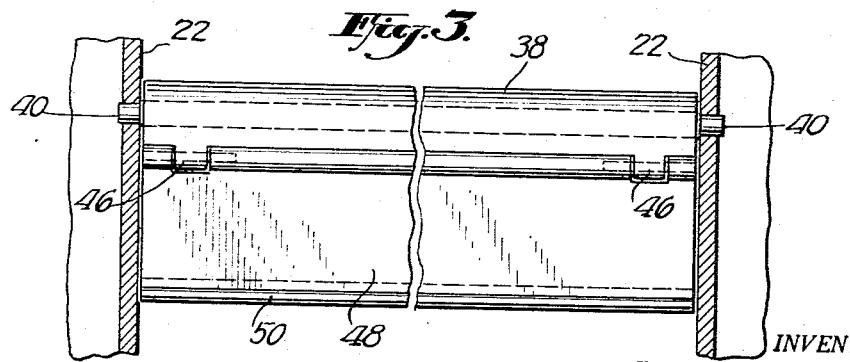
FIG. 3 is a view taken along line 3—3 of FIG. 2.

The space between the surface of each evaporator plate 20 and the wall defined by its associated folded over condenser conduit 32, is divided into a series of vertically aligned evaporator cells 36 by means of transverse partitions 38. These partitions extend from the front to the back of the device and are supported by means of hanger rods 40 which, as shown in FIG. 3, are connected to front and back walls 42 and 44 of the outer housing 22.

The transverse partitions 38 extend downwardly on either side of their hanger rods 40 to form in cross-section an inverted V, as can be seen in FIG. 2. This inverted V configuration serves as a baffle which prevents unevaporated brine droplets from splashing or being otherwise carried directly across to the surface of the condenser conduit 32 ad contaminating the fresh or pure water being formed thereon. The transverse partitions 38 are each provided with a hinged connection 46 which permits a portion 48 of the partition to pivot so that its lower edge, shown at 50, can swing against and away from the surface of the evaporator plate 20. A counterweight 52 is provided in connection with the hinged portion 48 and is supported at a point beyond the hinged connection 46 so that the lower edge 50 is urged against the surface of the plate. This arrangement serves to maintain a pressure differential between each of the cells 36 and at the same time permits a film of brine flowing down over the evaporator plates to pass from one cell to the next. Also, should the pressure in a lower cell decrease below the pressure in an upper cell beyond a given amount, the hinged portion 48 will swing away from the evaporator plate thus allowing the pressures in the cells to become more closely alike. The hinged arrangement further serves to permit passage from one cell to the next of gases and other non-condensables.

The transverse partitions are additionally provided with orifices 54 near the condenser conduit 32. These orifices permit the accumulated fresh water in each cell to pass down into the next lower cell and so on to the bottom of the device. At the bottom of the device there is provided a fresh water collection trough 56 under each set of vertically aligned cells 36. The fresh water produced by the device flows down through the orifices 54 and into the fresh water collection trough 56. This water may be collected and pumped out for use in any convenient manner.

During operation of the device, heated brine at a temperature of, for example, 200° F. overflows along the top edges of the troughs 24 and flows down over the surfaces of the evaporator plates 20 in the upper evaporator cell 36 of each series. As the brine flows down through each cell, a portion of the brine evaporates and the resulting vapor fills the space within the cell. The heat for producing this evaporation is provided by the unevaporated portions of the flowing brine; and accordingly, the temperature of the unevaporated brine becomes reduced. The amount of temperature reduction will, of course, depend upon the amount of each given segment of brine which does evaporate, and this in turn depends upon the pressure within the evaporator cell. That is, heat is extracted from the brine, producing vapor at the temperature of the brine, until enough vapor is produced to make the pressure within the cell equal to the saturated vapor pressure corresponding to the temperature reached by the brine.

The unevaporated brine then passes into the next lower cell in its series, this next cell being maintained at a somewhat lower pressure than the first cell. Thus, more of the brine evaporates, causing the unevaporated brine temperature to be reduced still further. This process continues in each cell of each series down to the lowermost cells wherein the lowest practical pressure is maintained. The unevaporated portion of the brine is then at a temperature corresponding to the saturated vapor temperature at this lowest pressure. This unevaporated brine is discharged through the residue collection trough 28.

While the brine passes over the evaporator plate surfaces in each evaporator cell 36, cooling water enters via the inlet pipe 35 and intake manifold 34 and passes up through the condenser conduits 32. The cooling water first passes through the portion of the condenser conduits exposed within the lowermost evaporator cells. Although the low pressure in these cells permits vapor to exist at a relatively low temperature, this temperature is always above the normal sea water temperature; and accordingly the sea water is capable of absorbing heat from the vapor causing it to condense on the condenser surfaces.

It will be appreciated that the multiple cell arrangement of the present invention permits a reduction in the amount of total condenser surface area needed to condense a given amount of vapor. If, for example, a given segment of the brine were to evaporate to its fullest extent in one cell, then the temperature of the entire amount of vapor produced from that segment would be at the exhaust or discharge temperature of the system. On the other hand, by permitting only a portion of the brine segment to evaporate in each individual cell, then only one of these portions of the segment ever reaches the discharge temperature, while each other portion is at a successively higher temperature. Accordingly, a given amount of cooling fluid is capable of attaining a higher temperature when brought into thermal communication of the multicell generated vapor than it is when brought into contact with the low temperature vapor produced in the single cell arrangement. Because of this, the cooling fluid in the multicell arrangement is capable of absorbing more heat per unit volume, and less fluid is required to produce a given amount of condensation. Conversely, the same amount of fluid may be utilized passing it through a smaller condenser conduit at a higher rate.

This concept is brought to full utilization in the present invention. It can be seen that simply by providing more and more pressure isolating cell dividers, the condenser size may be reduced; and to a considerable extent the small increase in capital cost encountered in providing additional evaporator cells, is more than offset by the resulting savings in condenser costs.

Figure 4:
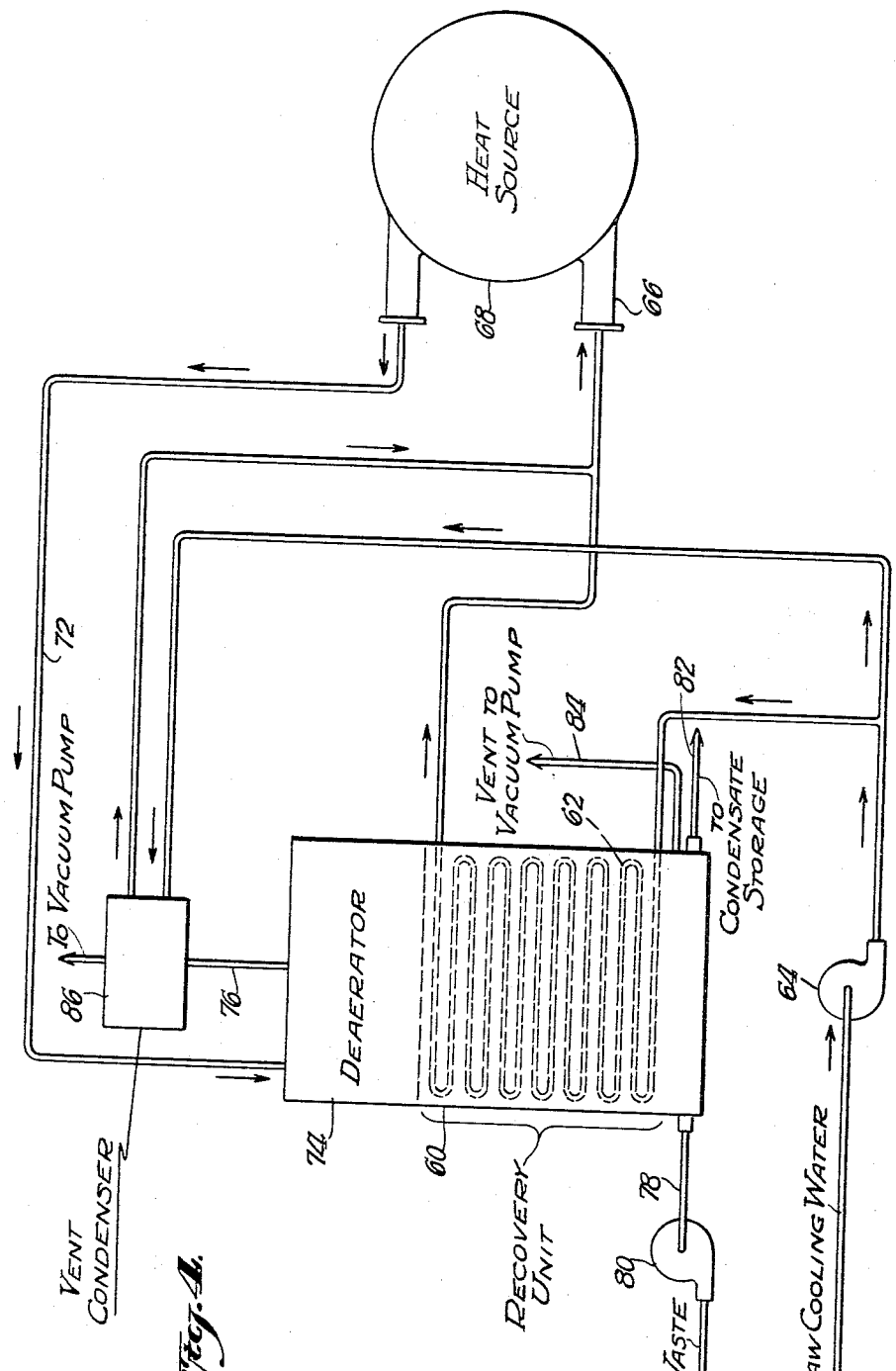
FIG. 4 is a schematic, illustrating a system incorporating the present invention.

An overall system utilizing the principle of the present invention is shown schematically in FIG. 4. This system incorporates a recovery unit 60, similar to the recovery unit described in detail in connection with FIGS. 1-3. The recovery unit 60 is shown with a condenser conduit 62 passing back and forth repeatedly as it proceeds to the top of the unit.

Raw cooling water such as brine or ocean water is pumped into the lower end of the condenser conduit by means of a cooling water pump 64. This cooling water is initially at normal sea water temperature (approximately 65° F.), but it picks up heat as described in passing upwardly through the unit so that when it exits therefrom, it has attained a temperature in the order of say 180° F.

The cooling water is then transferred to an intake opening 66 of a heat source 68. This heat source, as in the present embodiment, may be the main condenser in a power plant, so that the dual functions of heating brine to be converted to fresh water and of condensing expended vapors in a power plant are simultaneously performed. The brine, upon passing through the heat source 68, becomes further heated to a maximum temperature (e.g. 200° F.). It is then transferred via a heated brine conduit 72 to a deaerator 74. The function of the deaerator is to remove all non-condensable gases and other foreign material from the heated brine so as to insure maximum efficiency in effecting the conversion from brine to fresh water. This is accomplished by applying a vacuum to the brine in the deaerator through a vent tube 76.

After passing through the deaerator, the heated brine is distributed as described in thin film configuration to the upper cells in the recovery unit 60. The brine then flows down through the unit while a portion of the brine vaporizes and becomes converted to fresh water. The remainder of the brine, along with other non-condensables which pass completely through the recovery unit, are returned via a discharge line 78 and a waste pump 80 to the sea or other waste receiving area. The fresh water condensate recovered in the condensate collection troughs 56 of the recovery unit is withdrawn from the unit through a condensate recovery conduit 82.

In order to recover the maximum amount of fresh water from each pound of brine passing through the recovery unit, the lower portion of the unit is connected via a second vent line 84 to a vacuum pump or other source of negative pressure. This serves to maintain the pressure in the lowermost cells at a very low value; and consequently, it permits a lower temperature waste discharge so the amount of unrecovered heat energy is kept to a minimum.

A vent condenser 86 is located in the vent tube 76 of the deaerator 74. This vent condenser is provided with a condenser conduit, which like the condenser conduit 62 in the recovery unit 60 receives cooling water directly from the cooling water pump 64. This cooling water is used to condense fresh water from the vapors which inadvertently pass through the deaerator along with the non-condensable gases which are being removed. The cooling water output from the vent condenser is joined with the output of the condenser conduit 62 and fed to the heat source 68.

Figure 5:
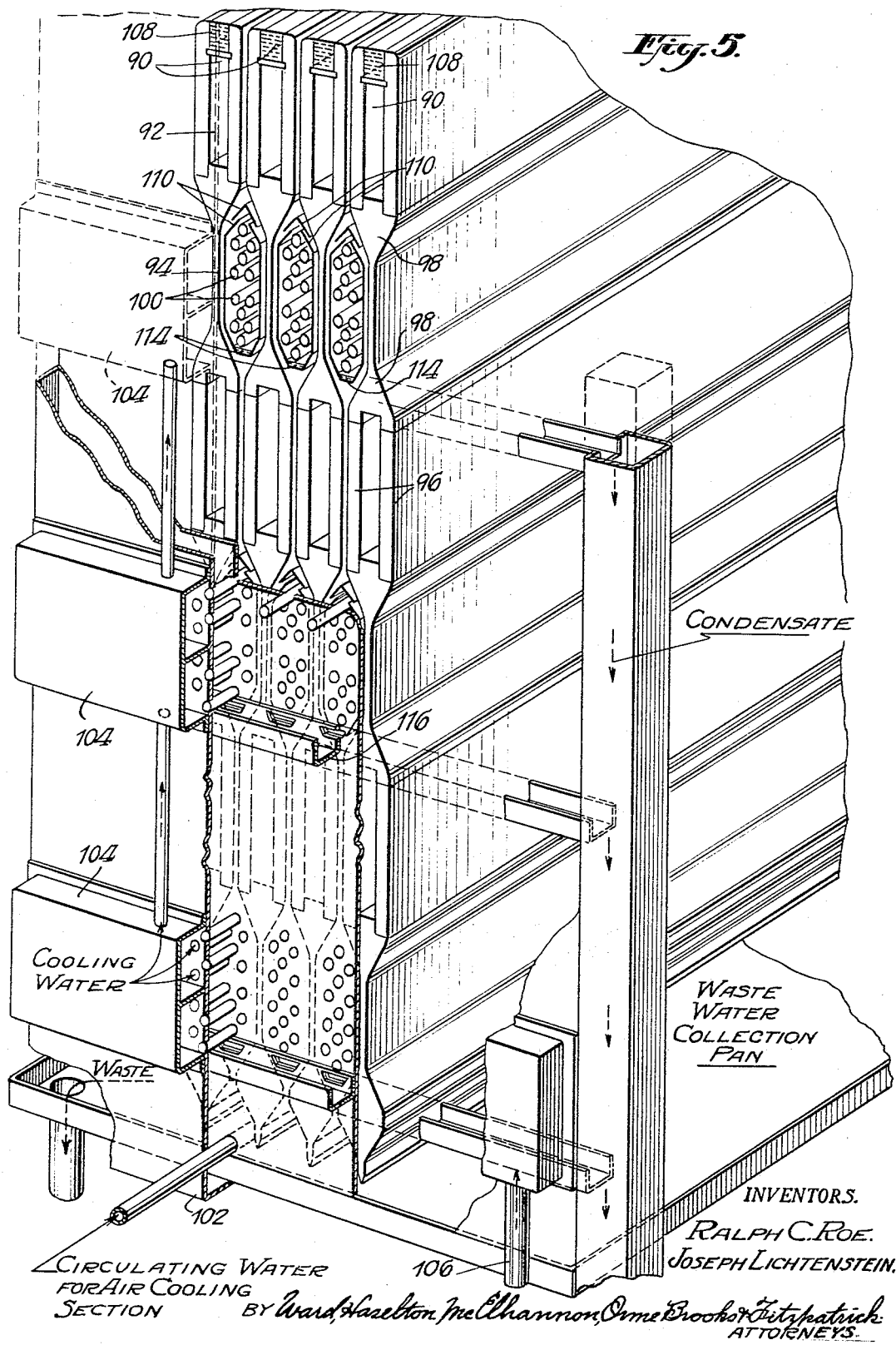
FIG. 5 is a perspective view, partially broken away, illustrating a representation of a further embodiment of the present invention.
Figure 6:
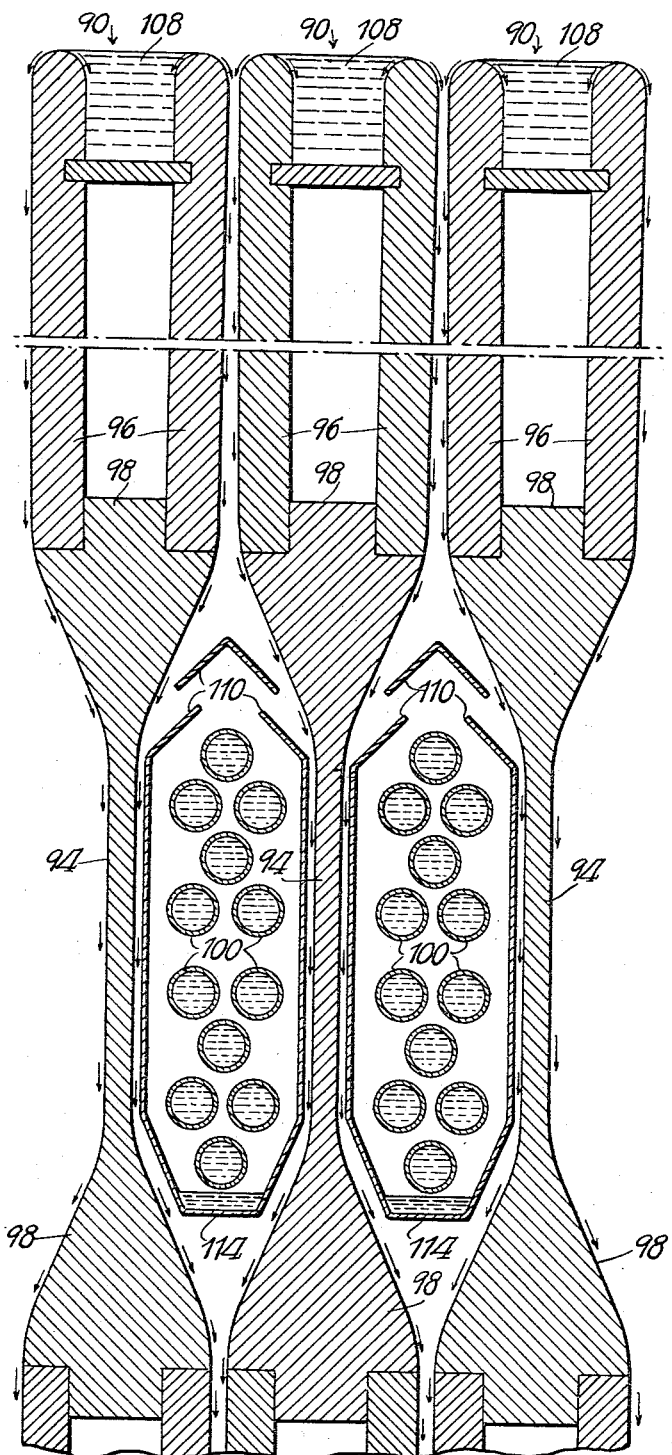
FIG. 6 is an enlarged section view taken along line 6—6 of FIG. 5.
Figure 7:
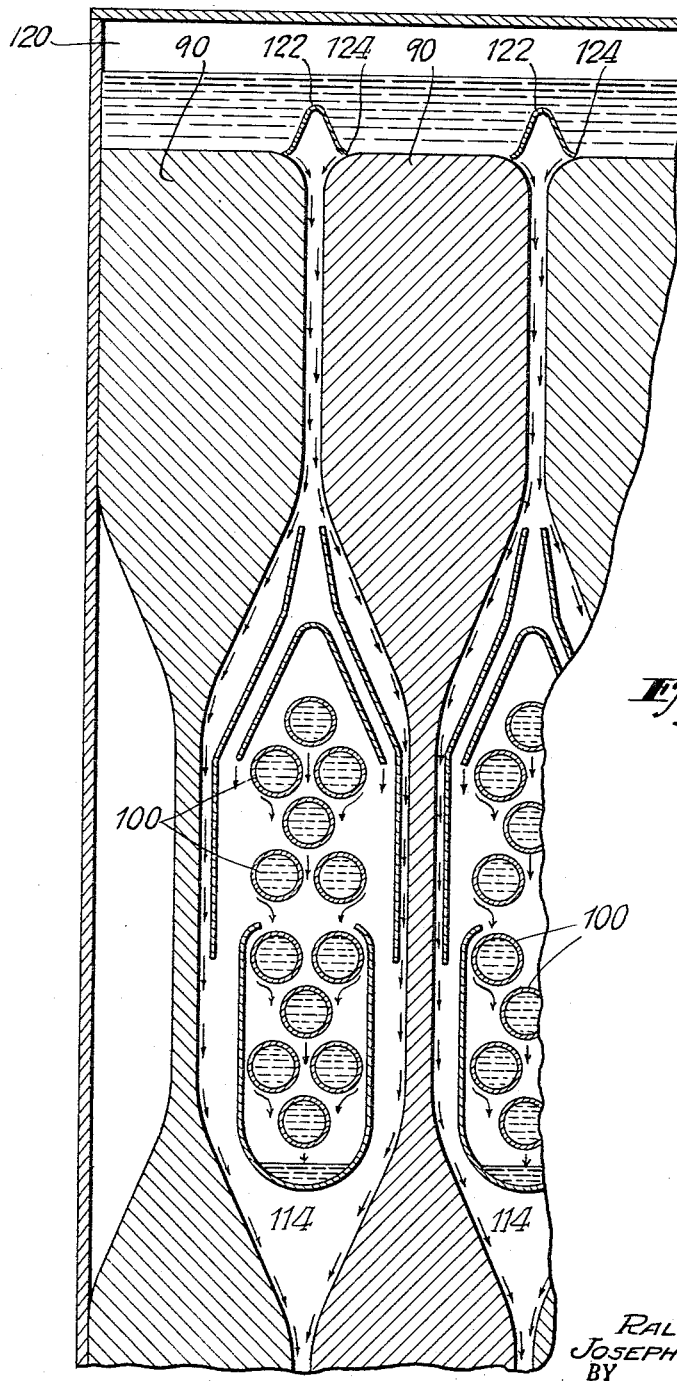
FIG. 7 is a view similar to FIG. 6 illustrating a modification thereof.

An alternate form of recovery unit is shown in FIGS. 5–7. Essentially, this alternate unit differs from the first unit described in that the condenser elements within each cell in the alternate unit take up only a fraction of the cell height; and the evaporator plate surfaces on opposite sides of the cell are brought very close together, thus defining narrow channels between the successive condenser elements. With this arrangement the closely spaced evaporator plate surfaces of the mutually facing evaporator plates cooperate to produce a nozzle effect upon the vapors which evaporate from the brine flowing down along the plates. By virtue of this nozzle effect a pressure differential is maintained between the upper and lower regions of the closely spaced plates, so that pressure isolation is achieved between vertically displaced cells without need for special pressure sealing elements.

As shown in FIGS. 5–7, the alternate recovery unit is comprised of a plurality of vertical plates 90 positioned parallel to each other in face-to-face arrangement. These plates are of composite construction, having wide sections 92 interspersed between narrow sections 94. The wide sections 92 are each formed by a pair of flat evaporator surface elements 96 held in spaced apart arrangement.

The narrow sections 94 are of solid material and are connected along thin top and bottom edges to tapered transition portions 98 which flare out to the evaporator surface elements 96. With these composite plates positioned in side-by-side relationship an extremely compact and efficient unit is provided with a minimum of expensive construction.

The narrow passages formed between the facing evaporator surface elements of adjacent plates operate, as will be explained, as pressure isolating nozzles.

The relatively wider spaces formed between the narrow sections 94 of the adjacent plates operate as condenser housings. As shown, the condenser housings are each provided with a plurality of condenser tubes 100 which extend longitudinally therethrough. These tubes pass through end walls 102 in the housing and open into condenser manifolds 104 which extend horizontally at different levels outside the end walls. These condenser manifolds receive cooling water such as sea water or brine which flows within the condenser tubes in one level and transmit this water up to the manifold at the next level. The cooling water enters the device via an inlet pipe 106 connected to the lower condenser manifold. It then passes from the manifold into the condenser tubes 100 in the lowermost evaporator cells. The cooling water then proceeds back and forth through the condenser tubes to the condenser manifolds at front and back of the device, passing each time up to the condenser manifold at the next higher level. As the water proceeds through the condenser tubes at each level, it absorbs heat from the evaporator cells and emerges from the unit at a somewhat elevated temperature. After passing through the condenser portion of the unit the condenser cooling water is further heated as in the preceding embodiment, by external means such as a power plant condenser and is thereafter redirected into troughs 108 in the tops of the evaporator plates in thin film configuration.

As the brine flows over the evaporator surface elements 96 of the evaporator plates 90, a portion of it vaporizes and flows downwardly through the narrow nozzle like passage between the facing evaporator surfaces.

As shown in the enlarged section views of FIGS. 6 and 7, the evaporator surface elements 96 are tapered somewhat so that the space between them is slightly greater toward their bottom edges. This helps to enhance the nozzle effect whereby the vapors which come off from the brine on each evaporator surface element move rapidly downward toward the condenser tubes 100 at a velocity such that a prescribed pressure differential is maintained between the top and bottom edges of the elements.

As the downwardly moving vapors enter into the wider condenser region of each cell, they pass through baffle plates 110 and into contact with the exterior surfaces of the condenser tubes 100 passing through the cell. The vapors condense on the surfaces of the evaporator and the resulting condensate is collected by means of fresh water troughs 112 which may as shown in FIGS. 6 and 7 be formed from the baffle plates 110.

These fresh water troughs empty into fresh water collection channels 114 mounted at the front of the unit just under each condenser manifold; and these channels in turn connect to a vertical fresh water output line 116 at one corner of the unit.

The discharge of the product can then proceed in any well known manner. In order to permit recovery of the fresh water from each cell without disturbing the pressure balance within the cell, there may be provided sealing means such as an hydraulic sealing loop between each cell so as to permit the flow of condensate downwards without disturbing the pressure differentials between the cells.

While the brine flows downwardly over the surfaces of the evaporator plates 90, only a small portion of each given segment of the brine vaporizes between the evaporator surface elements in each cell while the remainder flows on down over the tapered transition portions 98 and along the narrow plate sections 94 in the condenser regions. While it can be expected that much of the unevaporated brine will adhere to the plate surfaces, and therefore, will not come into contact with the fresh water condensate on the condenser tubes 100, nevertheless the baffle plates 110 are arranged and positioned particularly to prevent inadvertent splashing of brine droplets against the condenser tubes. The two arrangements shown in FIGS. 6 and 7 have been found to be particularly effective in this regard.

FIG. 7 additionially shows alternative means for achieving initial distribution of the brine over the evaporator plate surfaces. In this arrangement, the troughs 108 are replaced by a common unit reservoir 120 which extends over the tops of all the evaporator plates 90. Mounted immediately above each adjacent pair of plates is a cover member 122 which in conjunction with each plate forms slot-like openings 124 through which the heated brine may pass to be distributed over each of the plate surfaces.

Also shown in FIG. 7 is an alternate arrangement of fresh water troughs 114' and a somewhat more complex system of baffles 110'. These alternate baffles insure against inadvertent splashing of liquid brine against the condenser tubes 100 and thus aid in maintaining a very high degree of purity of fresh water output.

Having thus described my invention with particular reference to the preferred forms thereof, it will be obvious to those skilled in the art to which the invention pertains, after understanding my invention, that various other changes and modifications may be made therein without departing from the spirit and scope of my invention, as defined by the claims appended thereto.

What is claimed as new and desired to be secured by Letters Patent is:

1. A fresh water recovery device comprising a plurality of vertical evaporator plates positioned in closely spaced face-to-face relationship, condenser means positioned between said plates, means distributing water to be purified to flow downwardly over the surface area of said plates, the exterior surfaces of said evaporator plates and said condenser means being exposed within vertically aligned pressure isolated evaporator cells, said evaporator cells being pressure isolated in a manner permitting continuous and uninterrupted flow of brine downwardly from one cell to the next and means collecting the purified water which forms on the external surfaces of the condenser in each cell.

2. A fresh water recovery system comprising a plurality of vertically aligned evaporator cells each of said cells being provided with a pressure isolating arrangement therebetween and evaporator surfaces and condenser surfaces exposed at displaced locations therebetween, said pressure isolating means being constructed to permit continuous and uninterrupted flow of liquids downwardly from the evaporator surface of an upper cell to the evaporator surface of a lower cell, fluid conduit means arranged to direct water to be purified past the condenser surfaces in each cell proceeding from the lowest to the highest, in a manner isolating said water from the interior of the cells, means for collecting the water which passes through said fluid conduit means, means for further heating said water and for distributing the so-heated water over the evaporator surface of the uppermost cell to flow down among the cells, and means for collecting the condensate which forms on the condenser surfaces in each cell.

3. A fresh water recovery device comprising a housing, a plurality of evaporator plates extending from the front to the back of the housing and positioned in vertical parallel planes within said housing, condenser conduit means which enter into the housing and proceed therethrough between the evaporator plates, a plurality of transverse partitions extending between adjacent evaporator plates at different levels to divide the spaces between the plates into series of vertically aligned and mutually pressure isolated evaporator cells, the edges of said transverse partitions next to said evaporator plates being displaced therefrom by minute amounts to allow the continuous and uninterrupted flow of brine in controlled quantities down the surfaces of said plates to pass from one cell to another while a pressure differential is maintained between the cells, means for distributing brine along the upper edges of said evaporator plates to flow downwardly over the surfaces of the plates, means for causing a cooling fluid to flow through said condenser conduit means, and means for collecting the condensate which forms on the outer surfaces of said condenser conduit means.

4. A fresh water recovery device comprising a vertically disposed evaporator plate, a condenser conduit folded back and forth on itself in a horizontal direction in a plane parallel to and displaced from said evaporator plate, a plurality of transverse partitions extending from the condenser conduit to the evaporator plate at different levels and dividing the space between the evaporator plate and the condenser conduit into a plurality of vertically aligned pressure isolated evaporator cells, the edges of said transverse partitions next to said evaporator plate being automatically displaceable therefrom in response to given pressure differentials between adjacent cells to permit free and continuous flow of non-condensable matter from an upper cell into a lower cell while a prescribed pressure differential is maintained, means for distributing brine along the upper edge of said plate to flow downwardly over the surface of the plate, means for causing a cooling fluid to flow through said condenser conduit, and means for collecting the condensate which forms on the outer surfaces of said condenser conduit.

5. A fresh water recovery device comprising a vertically disposed evaporator plate, a condenser conduit folded back and forth on itself in a horizontal direction in a plane parallel to and displaced from said evaporator plate, a plurality of transverse partitions extending from the condenser conduit to the evaporator plate at different levels and dividing the space between the evaporator plate and the condenser conduit into a plurality of vertically aligned pressure isolated evaporator cells, said transverse partitions being in cross-section of an inverted V configuration to provide baffling effectiveness between said evaporator plate and said condenser conduit and to form condensate collection troughs in the vicinity of the condenser conduit in each cell, the edges of said transverse partitions next to said evaporator plate being displaced therefrom by a minute amount to allow controlled amounts of brine to flow down the surface of the plate and to pass continuously and uninterruptedly from one cell to another while a pressure differential is maintained between the cells, means for distributing brine along the upper edge of said plate to flow downwardly over the surfaces of the plate, means for causing a cooling fluid to flow through said condenser conduit and means for collecting the condensate which forms on the outer surfaces of said condenser conduit.

6. A fresh water recovery device comprising a vertically disposed evaporator plate, a condenser conduit folded back and forth on itself in a horizontal direction in a plane parallel to and displaced from said evaporator plate, a plurality of transverse partitions extending from the condenser conduit to the evaporator plate at different levels and dividing the space between the evaporator plate and the condenser conduit into a plurality of vertically aligned pressure isolated evaporator cells, said transverse partitions being in cross-section of an inverted V configuration to provide baffling effectiveness between said evaporator plate and said condenser conduit and to form condensate collection troughs in the vicinity of the condenser conduit in each cell, the portion of said partitions closest to said evaporator plate being hingedly connected to the remainder of their respective partitions to swing about a horizontal axis parallel to said plate means biasing the free edge of said partitions against said plate to provide a pressure seal between adjacent cells which responds to increased pressure differentials between such cells to permit free and uninterrupted flow of non-condensables and pressure normalizing vapors, means for distributing brine along the upper edge of said plate to flow downwardly over the surface of the plate in controlled amounts, means for causing a cooling fluid to flow through said condenser conduit and means for collecting the condensate which forms on the outer surfaces of said condenser conduit.

7. A recovery device as in claim 6 wherein the hinged portions of said transverse partitions are each provided with a counterweight mounted in cantilever fashion to extend transversely from points near their lower edge out beyond the hinged connection to their respective transverse partitions.

8. A fresh water recovery device comprising at least two evaporator plates positioned vertically in closely spaced face-to-face relationship, said plates being formed with alternate condenser sections interspersed between evaporator sections, said sections of each plate each extending horizontally and being located at the same vertical level as corresponding portions of its facing plate, the corresponding condenser sections of each plate being separated further from each other than corresponding evaporator sections to form condenser regions, the more closely spaced evaporator sections defining nozzle like passages between successive condenser regions, each nozzle like passage and adjacent condenser region forming an evaporator cell, a plurality of condenser conduits passing through the condenser regions, means for distributing brine to be purified to flow in controlled amounts down over the facing surfaces of said evaporator plates, means for causing a cooling fluid to flow within said condenser conduits and means for collecting condensate which forms on the exterior surfaces of said condenser conduits.

9. A fresh water recovery device comprising a least two evaporator plates positioned vertically in closely spaced face-to-face relationship, said plates each being formed with alternate thick sections interspersed between thin sections, said sections of each plate extending horizontally and being located at the same vertical levels as corresponding sections of its facing plate, the corresponding thin sections of each facing plate being more distantly separated and forming condenser spaces, the corresponding thick sections of each facing plate being more closely spaced and forming nozzle like passages which extend between successive condenser spaces, said nozzle like passages being of sufficient dimension to maintain a pressure differential from the upper to the lower portions thereof when vapors evaporating from fluids flowing thereover move rapidly through such passages, each nozzle like passage and adjacent condenser space forming an individual evaporator cell, a plurality of condenser conduits passing through each condenser region means for distributing brine to be purified to flow down in controlled amounts over the facing surfaces of said evaporator plates, means for causing a cooling fluid to flow within said condenser conduits and means for collecting condensate which forms on the surfaces of said condenser conduits.

10. A fresh water recovery system comprising a plurality of evaporator plates positioned vertically in closely spaced face-to-face relationship, said plates being shaped to form therebetween horizontally extending condenser spaces interspersed between horizontally extending narrow nozzle like evaporator passages, each evaporator passage and associated condenser region forming a separate evaporator cell, a plurality of tubes extending through each condenser region, means connecting the ends of the tubes to form a continuous conduit which passes through each of the condenser regions in series, means for distributing brine to be purified to flow down the facing surfaces of said evaporator plates, means for causing sea water to be purified to flow through said condenser conduit in a direction to pass from the bottom condenser region to the top, means for further heating the brine which passes through said condenser conduit, means for distributing the so-heated brine to flow down the facing surfaces of said evaporator plates and means for collecting condensate which forms on the surfaces of said condenser conduits.

11. A fresh water recovery device comprising means defining a continuous, generally vertically extending evaporator surface, means including said surface and defining a continuous downwardly extending fluid flow channel, a plurality of pressure isolating means arranged at displaced locations along said fluid flow channel dividing same into a plurality of aligned evaporator cells, said pressure isolating means being constructed to permit continuous and uninterrupted flow of liquids downwardly along said evaporator surface from each upper cell to the next lower cell, means distributing water to be purified to flow downwardly over said evaporator surface through each of said cells in succession, condenser means arranged in each cell and displaced therein from said evaporator surfaces and means collecting the purified water which forms on the external surfaces of the condenser in each cell.

12. Apparatus as in claim 11 wherein said pressure isolating means comprises elongated constrictures along said fluid flow channel, said constrictures forming narrow nozzle-like passages whereby the vapors which come off from the water to be purified as it moves along the evaporator surface within said constrictions move rapidly at a velocity which sustains a pressure gradient along said constrictions.

13. A fresh water recovery device comprising a housing, a plurality of evaporator plates positioned vertically in closely spaced face to face relationship within said housing, said plates each being formed with alternate thick sections interspersed between thin sections, said sections of each plate extending horizontally from the front to the back of the housing and further being located at the same vertical levels as corresponding sections of its mutually facing plate, the corresponding thin sections of each facing plate being more distantly separated and forming condenser spaces, the corresponding thick sections of each facing plate being more closely spaced and forming nozzle-like passages which extend between successive condenser spaces, said nozzle-like passages being of sufficient dimension to maintain a pressure differential from the upper to the lower portions thereof when vapors evaporating from fluid films flowing thereover move rapidly through such passages, each nozzle-like passage and adjacent condenser space forming an individual evaporator cell, a condenser arrangement comprising sets of tubes which extend through the front and back walls of each end of the housing and which pass through each of said condenser regions, a plurality of condenser manifolds communicating with the ends of the condenser tubes and forming with said tubes a continuous condenser conduit which extends serially through each of said evaporator cells from the top of the housing to the bottom thereof, a plurality of baffle plates extending through each of said condenser regions and partially around said condenser tubes to protect the surfaces of said tubes from splashing brine, a trough-like collecting means located under the condenser tubes in each condenser cell for recovering fresh water which condenses on the outer surfaces of said condenser tubes, means for directing cooling water to flow through said condenser conduit from the bottom of the housing to the top thereof, means for directing brine to flow in thin film configuration over the evaporator plate surfaces within said housing and means for collecting the fresh water which accumulates in each of the trough-like collecting means under each set of condenser tubes.

References Cited

UNITED STATES PATENTS

| | | | |
|---|---|---|---|
| 2,703,310 | 3/1955 | Kretchmar | 202—236 X |
| 2,861,925 | 11/1958 | Mende | 202—236 X |
| 3,004,590 | 10/1961 | Rosenblad | 159—13 |
| 3,190,817 | 6/1965 | Neugebauer | 202—236 |
| 3,219,554 | 11/1965 | Woodward | 203—11 X |

FOREIGN PATENTS 992,743  10/1951  France.

OTHER REFERENCES

Evaporation Plants Solve Water Shortages, Chemical Engineering, October 1956, pages 126 and 128.

NORMAN YUDKOFF, *Primary Examiner.*

J. B. DONIHEE, *Assistant Examiner.*